United States Patent
Piriou et al.

(10) Patent No.: US 7,367,327 B2
(45) Date of Patent: May 6, 2008

(54) DEVICE AND PROCESS FOR OVERFEEDING COMPRESSED GAS TO AN INTAKE PIPE OF A TURBOCHARGED ENGINE

(75) Inventors: Christian Piriou, Lyons (FR); Marc Lejeune, Lyons (FR)

(73) Assignee: Renault Trucks, Saint Priest (FR)

( * ) Notice: Subject to any disclaimer, the term of this patent is extended or adjusted under 35 U.S.C. 154(b) by 0 days.

(21) Appl. No.: 11/625,762

(22) Filed: Jan. 22, 2007

(65) Prior Publication Data

US 2007/0113553 A1 May 24, 2007

Related U.S. Application Data

(63) Continuation of application No. PCT/FR2005/050576, filed on Jul. 12, 2005.

(30) Foreign Application Priority Data

Jul. 21, 2004 (FR) .................................. 0451605

(51) Int. Cl.
*F02M 25/07* (2006.01)
*F02B 47/08* (2006.01)
*F02B 33/44* (2006.01)

(52) U.S. Cl. .................... 123/568.12; 123/568.11; 123/323; 60/605.2

(58) Field of Classification Search ............ 123/58.8, 123/320–323, 568.11, 568.12, 568.17, 568.18, 123/568.2, 568.21; 701/103, 108; 60/278, 60/279, 320, 321, 605.2

See application file for complete search history.

(56) References Cited

U.S. PATENT DOCUMENTS

| | | | | |
|---|---|---|---|---|
| 4,917,054 A | * | 4/1990 | Schmitz | 123/58.8 |
| 5,261,231 A | * | 11/1993 | Huh | 60/312 |
| 5,494,020 A | * | 2/1996 | Meng | 123/568.11 |
| 6,250,073 B1 | | 6/2001 | Zimmer et al. | |
| 6,295,815 B1 | * | 10/2001 | Bechle et al. | 60/605.2 |
| 6,328,003 B1 | * | 12/2001 | Gaertner et al. | 123/58.8 |
| 6,935,319 B2 | * | 8/2005 | Aupperle et al. | 123/568.12 |
| 2004/0065309 A1 | * | 4/2004 | Verschoor | 123/568.11 |
| 2007/0089715 A1 | * | 4/2007 | Kolavennu | 123/568.11 |

FOREIGN PATENT DOCUMENTS

| | | |
|---|---|---|
| DE | 4025565 A1 | 2/1992 |
| DE | 19717846 A1 | 11/1998 |
| DE | 19734801 A1 | 2/1999 |
| EP | 1024272 A | 8/2000 |

(Continued)

*Primary Examiner*—Willis R. Wolfe, Jr.
(74) *Attorney, Agent, or Firm*—Novak Druce + Quigg LLP

(57) ABSTRACT

Method and device (1) for boosting an intake pipe (4) of a turbocharged engine (5) with compressed gas. The method includes storing gases in a vessel (12) at a pressure greater than atmospheric pressure and, afterwards in injecting the gases into the intake pipe (4) in order to temporarily increase an inlet pressure during low-speed operation phases. The inventive device includes a connection for temporarily and alternately connecting the storing vessel (12) to an exhaust manifold (6) for recovering the gases during engine brake phases or to the intake pipe (4) during the temporary low-speed operation phases. The connection comprises a heat exchanger (10) mounted between the exhaust manifold (6) and the vessel (12).

12 Claims, 1 Drawing Sheet

FOREIGN PATENT DOCUMENTS

| | | | |
|---|---|---|---|
| FR | 2784419 A | 4/2000 | |
| FR | 2831609 A | 5/2003 | |
| GB | 2402633 A * | 12/2004 | ................. 60/320 |
| JP | 08232771 A * | 9/1996 | ............. 123/568.1 |
| KR | 9502620 B | 3/1995 | |
| KR | 9502621 B | 3/1995 | |
| WO | 9915773 A | 4/1999 | |
| WO | 0065210 A | 11/2000 | |

* cited by examiner

DEVICE AND PROCESS FOR OVERFEEDING COMPRESSED GAS TO AN INTAKE PIPE OF A TURBOCHARGED ENGINE

The present application is a continuation patent application of International Application No. PCT/FR2005/050576 filed 12 Jul. 2005 and which claims priority to French Application No. 0451605 filed 21 Jul. 2004. Said applications are expressly incorporated herein by reference in their entireties.

FIELD

The invention relates to the field of thermal engines and more particularly to turbocharged engines capable of fitting all types of vehicles. It relates especially to a device, which instantaneously boosts the pressure of the gases inside the intake pipe when the engine is at low speed and thus when the turbo-compressor is not yet stressed.

BACKGROUND

In general, devices for boosting pressure inside the intake pipe can be in various forms and can utilize different means for compressing air, storing it in a storage vessel and injecting it into the intake pipe when the engine is at low speed.

Compression of air can especially be done by mechanical means such as a compressor driven by a power take-off at the level of the transmission line of the engine. Documents KR 9502620 and KR 9502621 describe devices for improving the power of a combustion engine by means of a compressor. This compressor is therefore driven by a power take-off at the level of the gearbox. However, such a device thus requires particular engine architecture and thus cannot be connected to an existing engine. The additional compressor is also a permanent consumer of engine power since it is driven by the transmission line of the vehicle.

Devices are also known in which air is compressed by the turbo-compressor itself As described in document WO 00/65210, the surplus of gases compressed by the turbo-compressor is deflected from the intake pipe inside a storage vessel when the pressure prevailing inside this pipe exceeds a predetermined threshold. When, at another moment, the pressure measured inside the intake pipe is insufficient, the storage vessel, which reinjects the gases previously stored, is then opened. In this way, the pressure prevailing inside the intake pipe to boost the power of the engine is increased locally and instantaneously. In this case, the gases are compressed in an uncontrolled manner, as it is not possible to know exactly when the pressure in the intake pipe is going to exceed the predetermined threshold pressure from which the gases are stored in the storage vessel. Therefore, in certain cases, the storage vessel can empty and not refill immediately. A problem can then arise when it is necessary to inject compressed gases in the intake pipe. Such a device can thus be faulty due to an empty storage vessel.

Also, documents FR 2 831 609 and FR2 784 419 describe means for accumulation of fresh gases compressed by a piston in at least one of the cylinders. In this case, the input of gas to the accumulation means is connected to the exhaust means of the engine.

Therefore, the temperature of the gases is raised significantly during the compression phase and can reach a value of 600 to 700° C. in the accumulation means. Since the density of the gases is an inverse function of their temperature, their density is then very low and it is necessary to utilize very bulky accumulation means, requiring modification to the structure and the form of a vehicle, which they must equip. Such a device is thus not adapted to equip motorized vehicles subjected to stronger and stronger constraints aiming to reduce the bulkiness of accessories or of motorization.

Therefore, the aim of the invention is to provide secure and efficacious means for locally and instantaneously boosting the pressure prevailing inside the intake pipe in low-speed operation phases.

The object of the invention is to enable this increase in pressure without modifying the structure of the engine, without requiring additional power consumption to carry out compression of the gases and without increasing the bulk or structure of the vehicle.

The invention thus concerns a device for overfeeding compressed gases to an intake pipe of a turbocharged engine. In a known manner, this device is suitable for storing the gases in a storage vessel at a pressure greater than atmospheric pressure, then injecting them into the intake pipe to boost the intake pressure in the low-speed operation phases. Also, the device comprises connection means for connecting the storage vessel temporarily and alternatively either with the exhaust manifold to recover gases during engine brake phases, or with the intake pipe during low-speed operation phases.

In this way, the connection means can fill one or more storage vessels with exhaust gases compressed by the engine, which plays the role of compressor, due to the movement of the pistons inside the engine during which no fuel is injected. The storage of gases is consequently done during engine brake phases. In this way, during low-speed reacceleration, these compressed gases can be reinjected to instantaneously boost the pressure prevailing inside the intake pipe.

Therefore, since these gases are compressed by the engine during engine brake phases, they have not required additional power consumption. The gases, which are compressed by the pistons in the cylinders, are not burnt, since there has been no fuel injection.

In keeping with the invention, the device is characterized in that the connection means comprise a heat exchanger arranged between the exhaust manifold and the storage vessel.

Otherwise expressed, a heat exchanger can cool the gases whereof the temperature has increased due to the fact of their compression inside the cylinders of the engine where the temperature is much higher. In fact, the temperature of the gases at the input of the heat exchanger is around 700° C., while at the output thereof it reaches a temperature of around 200° C.

The influence of the losses of charges generated by the exchanger on the pressure of the gases is minimized since a drop in pressure of less than 200 mbars between the input and the output of the exchanger occurs. Such an exchanger can store gases having a density three times greater than that of the gases at their output of the exhaust means.

In practice, the connection means may comprise tubes for conveying the gases from the exhaust manifold to the storage vessel and from the storage vessel to the intake pipe.

Otherwise expressed, the exhaust manifold, the storage vessel and the intake pipe are connected by hoses adapted to resist the pressure.

Therefore, in a particular embodiment, two independent hoses can each make connections. Therefore, the storage vessel has an orifice for making the connection with the exhaust manifold and a second orifice enabling the connection with the intake pipe.

In a second variant, the storage vessel can have a single orifice serving both as storage and reinjection of gases. In this case a T-connection can be utilized for connecting three portions of independent hoses. In this way, one of the ends of each of the hoses is connected to the connector and the other is connected to the exhaust manifold, the storage vessel or the intake pipe.

Advantageously, the connection means can comprise at least one electro-valve for connecting as required portions of the abovementioned pipes to alternatively effect storage of gases in the storage vessel, then reinjection of the gases to the intake pipe.

In other words, electro-valves can close off a hose as a function of the operating state of the engine or of the necessary charge. Electro-valve is also understood as covering different connection means such as non-return valves especially.

In practice, the connection means can comprise a heat exchanger of the gas/liquid type in which the gas is compressed gas and the liquid is a liquid such as oil or the cooling liquid of the engine.

Advantageously, the input tube of the exchanger for hot gas can be split. In this way, compressed gases are collected at the level of the output of the exhaust of two banks of cylinders. Therefore, the filling time of the storage vessel for compressed gases is improved.

In practice, the tube conveying cooled gas at the output of the exchanger can be single. In other terms, at the level of the output of the exchanger, there is an orifice to which a hose is connected so as to feed the storage vessel with cooled gas.

By way of advantage, the connection means may comprise at least one pressure sensor for measuring the pressure of the gases inside the intake pipe. In this way, the pressure prevailing inside the intake pipe is known at any instant and when the latter is less than a predetermined threshold pressure, but also as a function of the operating state of the engine and its need for power, injection of the compressed gases contained inside the storage vessel is controlled.

In practice, the connection means can comprise a control unit for regulating the different electro-valves as a function of the signal transmitted by the pressure sensor.

Otherwise expressed, an electronic control unit receives information from one or more pressure sensors positioned on the intake pipe and the storage vessel. When there is need for power and especially at low speed when the turbo-compressor is still not delivering enough pressure inside the intake pipe, the control unit sends a signal to the different electro-valves to open them and/or close them, and connect the tubes in question and thus reinject gases contained inside the storage vessel.

In accordance with a particular embodiment, this device can be adapted to a pre-existing engine especially comprising a device for recycling of burnt gases, currently known as EGR for Exhaust Gas Recycling. Therefore, the invention can benefit from electro-valves belonging to this recycling system and already installed on the engine. Therefore, it then suffices to mount the storage vessel on the hose connecting the exhaust manifold to the intake pipe by means of a T connector after the EGR exchanger or the EGR valve.

Also, the control of the electro-valves can be adapted as a function of this novel function created by the recycling system. In fact, these two functions are created at different instants, namely when filling of the storage vessel is done during engine brake phases. Recycling of the exhaust gases is, per se, done during stabilized acceleration phases. Consequently, if the two circuits are common, the two functions they create operate at different instants. In fact, when the compressed gas contained in the storage vessel has to be reinjected, the recycling circuit for the gases is also closed to avoid reinjecting burnt gases in this original acceleration phase.

The invention also covers the process for overfeeding compressed gases at the level of an intake pipe of a turbocharged engine in the low-speed operation phases. This process comprises the stages of storage of gases inside a storage vessel at a pressure greater than atmospheric pressure and injection of said gases into the intake pipe to boost the intake pressure.

This process is characterized in that the gases are recovered at the level of an exhaust pipe of the engine during engine brake phases, cooled in a heat exchanger, conveyed to the storage vessel, stored in the storage vessel and reinjected into the intake pipe during low-speed operation phases.

Otherwise expressed, during engine brake phases, the gases are compressed by means of the pistons of the engine inside the cylinders, and then these gases are forwarded to a storage vessel. When there is need for power, and at low speed, the storage vessel is then placed in communication with the intake pipe so as to instantaneously boost the prevalent pressure inside this pipe.

BRIEF DESCRIPTION OF THE DRAWINGS

The method of carrying out the invention as well as the advantages flowing therefrom will emerge more clearly from the following description of the embodiment, given by way of example and not limitation, in support of the accompanying drawings in which.

DETAILED DESCRIPTION

As described hereinabove, the invention concerns a device for overfeeding compressed gases to an intake pipe.

Figure 1:
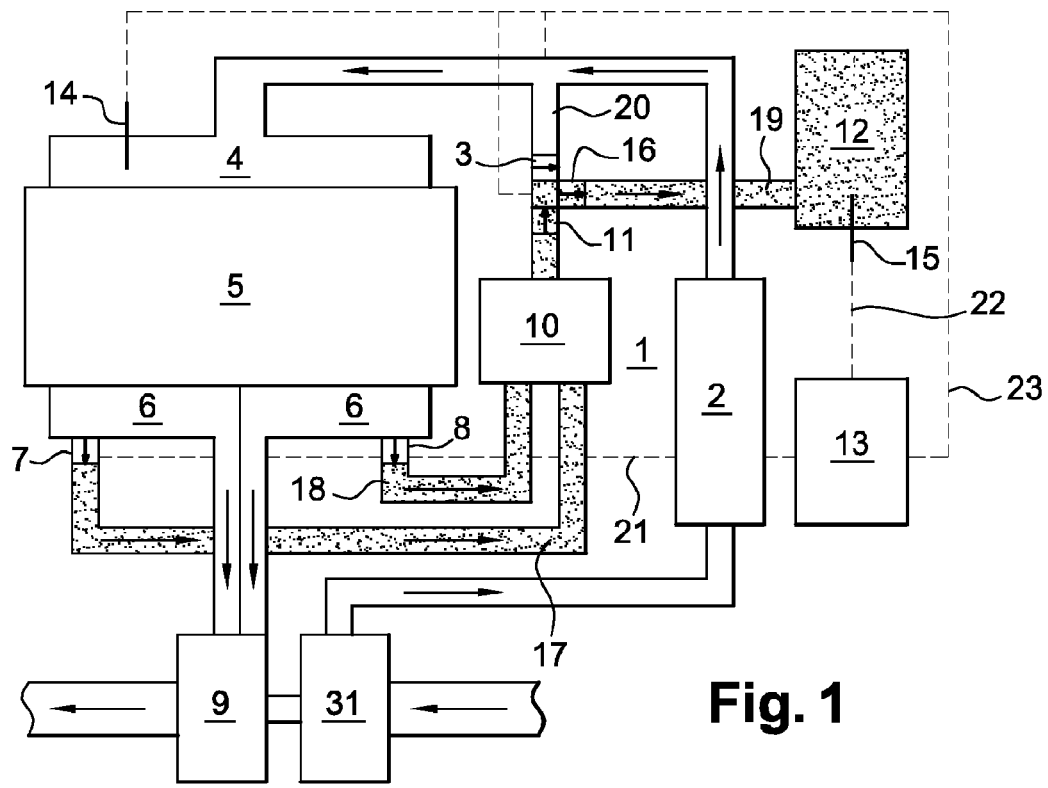
FIG. 1 is a schematic view of the device in a first state according to the present invention.

As shown in FIG. 1, the device (1) thus fits a combustion engine (5) overfed by means of a turbo-compressor. This turbo-compressor has a turbine (9) driving a compressor (31), which will boost the speed of the gases and thus their pressure inside the intake pipe.

As shown, a heat exchanger (2) can be added at the level of this intake pipe to modify the temperature of the intake gases and optimize it as a function of the better engine yield.

However, at low speed, the power of the turbine (9) is too low to create adequate pressure of the gases inside the intake pipe (4). This pressure is measured by means of a pressure sensor (14), then a signal (23) is transmitted to the control unit (13).

When the vehicle is in the deceleration phase; that is, the engine is in an engine brake phase, a portion of the fresh gases, compressed by the pistons, is recovered by means of the electro-valves (7,8) controlled by the control unit (13). These gases compressed by the pistons inside the cylinder combustion chambers of the engine (5) are then conveyed by means of two tubes (17,18) to the level of a heat exchanger (10) so as to lower their temperature.

As shown, the exchanger (10) can comprise two circuits for cooling the compressed gases in the combustion chambers of the engine. This type of exchanger can especially use a liquid to cool the gases.

Advantageously, the cooling liquid of the engine can be utilized since its normal operating temperature is around 80° C.

Such a heat exchanger (10) thus helps lower the temperature of the gases from a temperature of 600 to 700° C. at the exhaust output to a temperature of around 200° C. This drop in temperature then raises the mass density of the gases and allows them to be stored in a small-size storage vessel (11).

The loss in charge generated by the exchanger on the pressure of the gases is negligible and rises to 100 to 200 mbar.

The control unit (13) thus controls the electro-valves (3, 11, 16) so as to orient these compressed gases in the direction of the tube (19) and allow the storage vessel (12) to be filled. When the maximum pressure inside this storage vessel (12) is reached, the sensor (15) then transmits a signal (22) to the control unit (13) to stop the filling of the storage vessel (12). The electrovalve (16) is thus closed until a drop in pressure inside the intake pipe (4) is detected by the pressure sensor (14), and during a low-speed phase.

Figure 2:
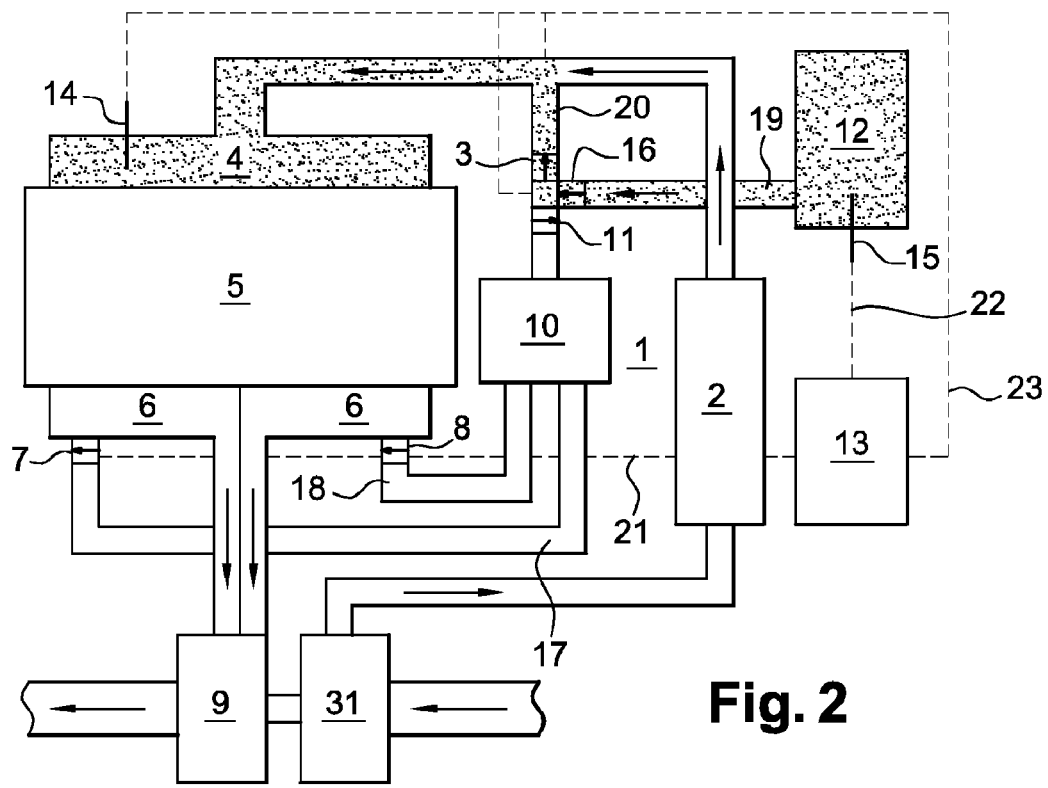
FIG. 2 is a schematic view of the device in a second state according to the present invention.

Therefore, as shown in FIG. 2, when the vehicle is in the low-speed phase and when a contribution of power is necessary instantaneously, the control unit (13) then controls the electro-valves (3, 11, 16) so as to orient the compressed gases inside a tube (20) connected with the intake pipe (4).

Therefore, the pressure inside the intake pipe (4) rises rapidly, generating an instantaneous contribution of power so as to offset the response time of the turbo-compressor. When the pressure ensured by the sensor (14) reaches a predetermined threshold, the control unit (13) then again controls the electro-valves (3, 11, 16) so as to cut off injection of the compressed gases from the storage vessel (12), the cycle described in FIG. 1 then able to be repeated.

As illustrated, this device has been connected to an engine pre-equipped with a recycling system for exhaust gases. Consequently, in this embodiment it does not constitute a complex solution to implement, and is relatively lightweight in terms of additional pieces.

It emerges from the preceding that the device according to the invention has multiple advantages, especially: (1) it provides an adaptable solution to existing engines for optimizing the response time of a turbo-compressor; (2) it does not consume additional power; and it is not bulky.

What is claimed is:

1. A process for overfeeding of compressed gases at an intake pipe (4) of a turbocharged engine (5) in the low-speed operation phases, said process comprising:

storing gases inside a storage vessel (12) at a pressure greater than atmospheric pressure and injecting said gases in the intake pipe (4) and thereby boosting intake pressure of the turbocharged engine;

recovering the compressed gases at an exhaust pipe (6) of the engine (5) during engine brake phases;

cooling the compressed gases in a heat exchanger (10);

conveying the compressed gases to the storage vessel (12);

storing the compressed gases in the storage vessel (12); and reinjecting the compressed gases into the intake pipe (4) during low-speed operation phases.

2. A device (1) for overfeeding compressed gases in an intake pipe (4) of a turbocharged engine (5) comprising:

said device (1) being configured to store the gases in a storage vessel (12) at a pressure greater than atmospheric pressure and then inject the gases in the intake pipe (4) to boost intake pressure in low-speed operation phases;

said device further comprising connection means for connecting the storage vessel (12) temporarily and alternatively either with the exhaust manifold (6) to recover gases during engine brake phases, or with the intake pipe (4) during low-speed operation phases; and said connection means comprises a heat exchanger (10) arranged between the exhaust manifold (6) and the storage vessel (12).

3. The device as recited in claim 2, wherein the heat exchanger (10) is of the gas/liquid type.

4. The device as recited in claim 1, wherein the tube (7, 8) supplying the exchanger (10) with hot gas is split.

5. The device as recited in claim 2, wherein the tube (20) channeling cooled gas to the output of the exchanger (10) is single.

6. The device as recited in claim 2, wherein the connection means comprise at least one pressure sensor (14) for measuring the pressure of the gases inside the intake pipe (4).

7. The device as recited in claim 6, wherein the connection means comprises a control unit (13) for controlling the different electro-valves (3, 7, 8, 11, 16) as a function of the signal transmitted by the pressure sensor (14).

8. The device as recited in claim 2, wherein the connection means comprises tubes (17-20) for conveying the gases from the exhaust manifold (6) to the storage vessel (12) and from the storage vessel (12) to the intake pipe (4).

9. The device as recited in claim 8, wherein the connection means comprises tubes (17-20) and electro-valves (3, 7, 8, 11, 16) belonging to a recycling system of burnt gases pre-equipping the engine (5).

10. The device as recited in claim 8, wherein the connection means comprises at least one electro-valve (3, 7, 8, 11, 16) for opening and closing portions of tubes (17-20) to effect, alternatively, storage of the gases in the storage vessel (12) then reinject the gases in the intake pipe (4).

11. The device as recited in claim 10, wherein the connection means comprises a control unit (13) for controlling the different electro-valves (3, 7, 8, 11, 16) as a function of the signal transmitted by the pressure sensor (14).

12. The device as recited in claim 10, wherein the connection means comprises tubes (17-20) and electro-valves (3, 7, 8, 11, 16) belonging to a recycling system of burnt gases pre-equipping the engine (5).

* * * * *

UNITED STATES PATENT AND TRADEMARK OFFICE
CERTIFICATE OF CORRECTION

| | |
|---|---|
| PATENT NO. | : 7,367,327 B2 |
| APPLICATION NO. | : 11/625762 |
| DATED | : May 6, 2008 |
| INVENTOR(S) | : Christian Piriou and Marc Lejeune |

It is certified that error appears in the above-identified patent and that said Letters Patent is hereby corrected as shown below:

On the title page correct "Lyons" to --Lyon-- at line (75), to read as follows:

(75)   Inventors:  Christian Piriou, Lyon (FR); Marc Lejeune, Lyon (FR)

Signed and Sealed this

Twelfth Day of August, 2008

JON W. DUDAS
*Director of the United States Patent and Trademark Office*